United States Patent Office 3,105,188
Patented Sept. 24, 1963

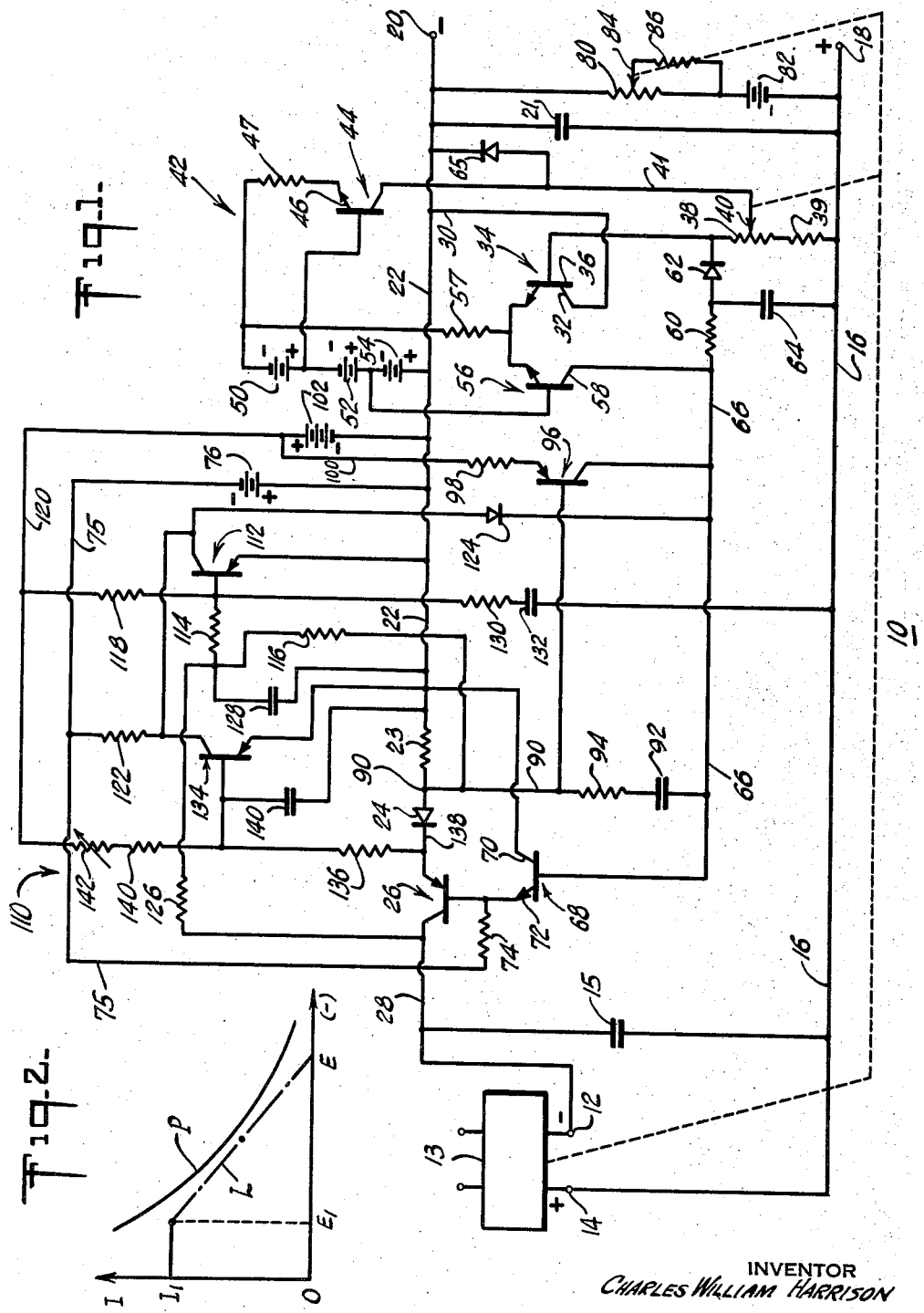
Sept. 24, 1963
C. W. HARRISON
ALL-TRANSISTOR REGULATED POWER SUPPLY
HAVING A PROTECTION CIRCUIT
Filed March 26, 1959
3,105,188
INVENTOR
CHARLES WILLIAM HARRISON
BY
Curtis, Morris & Safford.
ATTORNEYS:

3,105,188
ALL-TRANSISTOR REGULATED POWER SUPPLY HAVING A PROTECTION CIRCUIT
Charles William Harrison, Millington, N.J., assignor to Hewlett Packard Company, Palo Alto, Calif., a corporation of California
Filed Mar. 26, 1959, Ser. No. 802,188
9 Claims. (Cl. 323—22)

This invention relates to an all-transistor regulated voltage supply, and more particularly to an overload protection circuit for such a supply.

An object of this invention is to provide a protection circuit for a regulated direct voltage power supply which is able to operate continuously during overload to prevent the current drawn from the supply exceeding a set value while at the same time permitting a safe amount of current to flow.

Another object is to provide a protection circuit which prevents damage to the main regulating transistor or transistors under all conditions of overload or short circuit.

A further object is to provide a circuit which can be externally set to limit the output current from the supply at any desired value from full rated current to effectively zero current.

Still another object is to provide an overload protection circuit which is very fast and efficient in operation but yet relatively simple and inexpensive.

These and other objects will in part be understood from and in part pointed out in the description given hereinafter.

Transistors, which can operate without a heated filament and which require virtually no standby power, make possible the realization of compact, highly efficient equipment. However, among the limitations of transistors is their susceptibility to damage or destruction by excessive internal power dissipation.

In a transistorized regulated voltage supply, one or more power transistors are connected between an unregulated voltage source and a pair of output terminals to which a load can be connected. Then by means of a feedback network, comprising for example several amplifying transistors connected between the output terminals and the main regulating transistors, the latter are variably biased to change the voltage across them in proper phase and magnitude to keep the voltage at the output terminals effectively constant. The current drawn by a load from the output terminals of the supply passes through the main regulating transistor or transistors, and thus must be prevented from reaching a value so large as to damage them. This problem of protecting the transistors is made doubly difficult by the fact that only a momentary excess of current or voltage can permanently damage a transistor. Moreover, in circuits designed to regulate an output voltage at a value appreciably above zero, when a short circuit occurs the entire input voltage is impressed across the regulating transistors. Therefore, assuming the input voltage is left constant, the short circuit current must be reduced substantially below maximum rated output current to stay within the permissible power dissipation of the regulating transistors. The present invention provides an improved protection circuit fulfilling these requirements.

This circuit limits to a maximum value the current which can be drawn from the supply, but yet this limiting action is not discontinuous. Thus, as the load connected to the output terminals of the supply increases beyond a value, which can be externally adjusted and whose maximum is determined by the capabilities of the main regulating transistors, effectively no additional output current is allowed to flow but, instead, the output voltage is reduced. This means that for a moderate or temporary overload, power is still supplied to the load, contrary to the case of a fuse element which burns out on overload and turns off all power. With the present circuit in the event of short circuit of the load, the output current is quickly reduced to a very small value so that the product of the voltage-drop-across and current-flow-through the main regulating transistors does not exceed their power handling capabilities. However, as soon as the overload or short circuit condition is corrected, the circuit permits the power supply to operate in normal fashion, there is no delay before resumption of operation and there is no need to reset or replace a fuse element.

A better understanding of the invention together with a fuller appreciation of its many advantages will best be gained from the following description given in connection with the accompanying drawings wherein:

FIGURE 1 is a circuit diagram of an all-transistor regulated voltage supply embodying features of the invention, and FIGURE 2 is a graph showing current-through versus voltage-across the main regulating element in the supply.

The voltage regulating supply 10 shown in FIGURE 1 is supplied at the left through the terminals 12 and 14 with an unregulated direct voltage from a supply 13, terminal 12 being negative and being bypassed to the positive one by a large capacitor 15. Terminal 14 constitutes one end of a ground bus 16 for the circuit. The right end of this bus is the positive output terminal 18. The corresponding negative output terminal 20 is bypassed to terminal 18 by a large filter capacitor 21. The voltage on this negative terminal is obtained through an output lead 22, a small, current monitoring resistor 23, a silicon diode 24 and a series regulating transistor 26 from negative input terminal 12 via a short input lead 28. By controlling the series resistance of the regulating transistor, through the action of elements to be described shortly, the voltage on output terminals 18 and 20 is regulated at any pre-set voltage for any load current within the ratings of the circuit. To accommodate a maximum output voltage in excess of that which can safely be handled by a single regulating transistor 26, it can be connected in series with a second transistor (not shown). To handle heavier output currents, regulating transistor 26 can be paralleled by one or more branches of series connected regulating transistors (not shown).

Circuit 10 contains a number of elements not directly forming part of the invention and which are described in detail in the inventor's co-pending application Serial No. 725,556, filed April 1, 1958, now U.S. Patent 2,915,693. However, for the sake of completeness and to aid in understanding the present invention more completely, these elements will be briefly described herein.

As was mentioned above, small variations in the output voltage are amplified and applied in proper phase to regulating transistor 26 to control the voltage drop across it and thus maintain the output voltage effectively constant at a set value. To this end output lead 22 is connected through a conductor 30 to the collector electrode 32 of an input amplifying transistor 34. The base 36 of this transistor is biased from a voltage developed across a potentiometer 38 and the small resistor 39 connected in series to positive bus 16. The movable slider 40 of this potentiometer is connected via lead 41 to a high impedance current source, generally indicated at 42. Accordingly, when slider 40 is set in its uppermost position along potentiometer 38, the current flowing from the slider up through the potentiometer from bus 16 will produce a maximum voltage drop across the potentiometer and thus set the regulated output voltage on terminals 18 and 20 at its maximum value. Conversely, when slider 40 is in its lowest position on potentiometer 38 the output voltage at terminals 18 and 20 will be zero. The slider is ganged (as indicated by the dotted lines) with a variable element within input supply 13 so that the input voltage will be increased or decreased in accordance with the setting of the output voltage. In this way the voltage drop across the regulating transistor is kept near a normal working value of, for example, 5 to 10 volts. Regardless of the setting of slider 40 along potentiometer 38 the impedance seen by base 36 of input transistor 34 remains substantially constant. The advantages of this constant current bias arrangement are set forth in detail in the inventor's co-pending application, Serial No. 646,764, filed March 18, 1957, now U.S. Patent 2,942,174.

Constant current source 42 includes a transistor 44 connected as an emitter follower whose emitter 46 has in series with it a resistor 47. A constant current is drawn from the emitter through this resistor and the batteries 50, 52 and 54 connected in series to lead 22. The base of this transistor is biased relative to its emitter by battery 50 and the voltage across resistor 47. Since these voltages are constant, transistor 44 draws a constant current from potentiometer 38 and shows effectively a high impedance. The voltage of battery 54 is made approximately equal and opposite the voltage drop across resistor 39.

Input transistor 34 comprises one side of a differential amplifier, the other side being a similar transistor 56 whose emitter is connected along with the emitter of transistor 34 through a resistor 57 to the negative side of battery 50. The base of transistor 56 is connected to the junction of battery 54 and battery 52. Part of the output current from the collector 58 of transistor 56 is returned through a positive feedback resistor 60 and a diode 62 to base 36 of transistor 34 thereby to increase the amplification of the differential amplifier. Since the impedance seen by base 36 of transistor 34 is substantially constant for any setting of potentiometer 38, the amount of positive feedback present for any setting of slider 40 will be substantially constant. This means that the circuit will operate at maximum regulating efficiency regardless of whether the output voltage between terminals 18 and 20 is set at its minimum, at its maximum, or at any value in between. To prevent instability at higher frequencies and to minimize hum pickup at output terminals 18 and 20, the right end of positive feedback resistor 60 is bypassed through the capacitor 64 to the positive bus 16. To prevent a sudden change in the setting slider 40 along potentiometer 38 from burning out transistors 34, 56 or 44 because of the charge on capacitor 64, lead 41 is bypassed to lead 22 by a diode 65.

An amplified signal corresponding to any variation in the voltage between leads 22 and 16 is obtained from the collector 58 of transistor 56 and is applied through a lead 66 to the base of a driver transistor 68. The collector 70 of transistor 68 is connected directly to output lead 22. Its emitter 72 is connected to the base of regulating transistor 26 and also connected through a load resistor 74 via a lead 75 to a battery 76 whose positive terminal is connected to output lead 22. Any variation in the current drawn through lead 66 from the base of transistor 68 causes an increase or decrease in the current flowing through transistor 68 and corresponding changes in the current through and voltage across regulating transistor 26. The voltage drop across resistor 23 and silicon diode 24 is of the order of one volt and in accordance with the invention provides the operating potential for driver transistor 68. This transistor is of NPN type, whereas regulating transistor 26 is PNP, and a current flow through it of the order of 30 milliamperes can control regulating transistor 26 handling an ampere or so.

Also in accordance with the invention, to improve the transient stability and recovery time of supply 10, output terminals 18 and 20 are shunted by a potentiometer 80 in series with a battery 82 whose negative side is connected to lead 16. The slider 84 of the potentiometer is connected through a resistor 86 to the junction of potentiometer 80 and battery 82 and is linearly ganged with slider 40 and the variable element in unregulated supply 13. As the output voltage is increased by changing the position of slider 40, the effective resistance of potentiometer 80 is changed so that the current through it stays approximately constant for any value of output voltage between zero and maximum. Thus the efficiency of this current bleed arrangement is improved over that of a constant shunt resistor, for example.

To further prevent instability at higher frequencies, lead 66 is bypassed to the junction 90 between resistor 23 and silicon diode 24 by a capacitor 92 in series with a resistor 94. Operating currents for transistors 34 and 56 are supplied to lead 66 from a high impedance current source comprising a transistor 96 whose collector is connected directly to lead 66 and whose base is connected to junction 90. The emitter of this transistor is connected through a resistor 98 and a lead 100 to the positive side of a battery 102 whose negative terminal is connected to output lead 22. The shunt resistance shown by transistor 96 to lead 66 is very high relative to the input resistance of driver transistor 68. Accordingly, the drive signal from transistor 56 is not attenuated.

To prevent burnout of main regulating transistor 26, supply 10 is provided according to the invention with a protection circuit generally indicated at 110. This comprises a power overload sensing transistor 112 whose emitter is directly connected to lead 22. Normally the base of this transistor is held sufficiently positive relative to the emitter so that substantially no emitter-collector current flows. However, when the output current reaches a given value, the voltage drop across resistor 23 will make more negative the potential of the base of transistor 112 relative to its emitter and enable it to conduct. The amount of current flowing from emitter to collector of overload transistor 112, as will be explained shortly, controls and limits the current through main regulating transistor 26.

To sense the voltage drop across series resistor 23, the base of overload transistor 112 is connected through a resistor 114 and a resistor 116 to the junction 90 of resistor 23 and silicon diode 24. An adjustable positive bias for the base of overload transistor 112 to counter the voltage across resistor 23 is provided by a resistor 118 connected through a lead 120 to battery 102. By properly choosing the value of resistor 118, overload transistor 112 can be made to conduct and limit the load current as soon as it exceeds a maximum safe value.

The collector of overload transistor 112 is connected to one end of a current limiting resistor 122, the other end of which is connected to a lead 75 and battery 76. The collector of transistor 112 is also coupled through a diode 124 to control lead 66 but normally when the transistor is not conducting its collector is negative relative to lead 66 and so, no current flows through diode 124. However, when overload transistor 112 begins to conduct, its collector quickly becomes positive and current flows into lead 66 through diode 124. This in turn by controlling driver transistor 68 acts to limit the emitter-collector current through main regulating transistor 26 to a maximum safe value.

Overload transistor 112 is also responsive to the voltage drop across main regulating transistor 26 in addition to the load current through it. In this way the power dissipation within transistor 26 is kept within safe limits. FIGURE 2 illustrates by line L the way output load current I flowing through regulating transistor 26 is dependent upon the voltage drop E across it. Below the value $E_1$ a maximum amount of current $I_1$ is permitted to flow, whereas above this value of E the current is decreased toward zero. Every point on line L, by proper choice of elements associated with overload transistor 112, can thus be below the curved line P representing maximum allowable power dissipation for regulating transistor 26. The right portion of line L can be made curved and virtually congruent with line P by making resistor 116 non-linear (e.g. by paralleling it with another resistor in series with a silicon diode having a small forward voltage drop).

In order to sense the voltage across transistor 26, the base of overload transistor 112 is connected through resistor 114 and a resistor 126 whose left end is connected to lead 28 on the collector side of transistor 26. As the emitter to collector voltage of the latter increases the bias on the base of overload transistor 112 will change accordingly and the output current will be controlled as explained above.

Since overload transistor 112 and its associated elements comprise an active feedback loop it is necessary for stability to insure that unwanted oscillations or transients will not occur. This is accomplished by connecting between lead 22 and the junction of resistors 114, 116 and 126 a large filter capacitor 128. This capacitor, however, would otherwise make the action of overload transistor 112, in response to a sudden short circuit of output terminals 18 and 20, too slow to prevent burnout of regulating transistor 26. Accordingly, to make overload transistor 112 immediately responsive to a short circuit of the load, while at the same time not sacrificing stability, the base of this transistor is connected through a charging resistor 130 and a capacitor 132 to positive lead 16. Now, in the event of short circuit the electric charge stored in capacitor 132 causes overload transistor 112 to immediately conduct and turn off regulating transistor 26. Thereafter, as the charge across filter capacitor 128 changes, overload protection circuit 110 will operate as described above.

Overload circuit 110 in addition to keeping the output current and the voltage drop across regulating transistor 26 within its maximum ratings, as determined by curve P in FIGURE 2, also permits the output current to be limited at any value between the full maximum value $I_1$ and effectively zero current. To this end, a current limiting transistor 134 is included in the circuit. By manually setting the bias on this transistor, as will be explained shortly, the output current will be limited at a chosen value, which value can be set effectively all the way to zero. Thus, delicate electrical equipment can be connected to supply 10 with the assurance that the equipment will not receive more than a safe, small amount of current determined by the capabilities of the equipment, and not the full maximum current $I_1$.

Current limiting transistor 134 has its emitter connected directly to lead 22 and its collector in parallel with the collector of overload transistor 112. Thus, when current limiting transistor 134 conducts, it will pump current through diode 124 into lead 66 to control regulating transistor 26 in the same way as overload transistor 112. The base of current limiting transistor 134 is connected through a resistor 136 to the junction 138 between silicon diode 24 and regulating transistor 26. Additionally, the base of transistor 134 is connected to a resistor 140 and a variable resistor 142 to lead 120 and battery 102. By adjusting resistor 142, the bias on current limiting transistor 134 can be set so that it turns on when the load current through resistor 23 and silicon diode 24 reaches a chosen value. Because the forward voltage drop across diode 24 is variable with current, it serves as a low ohmage variable or non-linear resistor and facilitates the action of current limiting transistor 134 in limiting the output load current effectively to zero, if desired. Since current limiting transistor 134 operates independently of overload transistor 112, the position of the downward sloping right hand portion of line L in FIGURE 2 will not be shifted relative to curve P by adjustment in the bias on transistor 134. The net bias on overload transistor 112 is independent of the non-linear voltage drop across silicon diode 24. Thus, the right hand portion of line L can be permanently set just to the left of curve P, which means maximum utilization of the capacity of regulating transistor 26. The transient stability of current limiting transistor 134 is insured by connecting its base through a capacitor 140 to lead 22.

In a power supply substantially the same as supply 10 which has been built and successfully operated, resistor 114 was 1000 ohms; resistor 116, 200 ohms; resistor 126, 30,000 ohms; resistor 23, ¼ ohm; and diode 24, type 1N1115 silicon. The maximum load current $I_1$ was one ampere, and the voltage was 0 to 30 volts.

The above description is intended in illustration and not in limitation of the invention. Various changes in the embodiment described may occur to those skilled in the art and these can be made without departing from the spirit or scope of the invention as set forth.

I claim:

1. An improved, all-transistor regulated voltage supply comprising a first and a second input terminal, a first and a second output terminal, means to supply a direct voltage to said input terminals, a conductive connection between said second input and output terminals, an output lead connected to said first output terminal, a power regulating transistor having two output electrodes and a control electrode, low ohmic connections joining said output electrodes to said output lead and to said first input terminal, a driver transistor having an output connected to said control electrode and having an input, a first transistor feedback amplifier whose input is connected to said output leads and whose output is connected to the input of said driver transistor, a second transistor feedback amplifier connected to sense the voltage drop across and current through said regulating transistor, said second amplifier above pre-determined values of said voltage drop and current being continuously operable to control said driver transistor to limit the power dissipated in said regulating transistor to a safe value for any combination of said voltage drop and current.

2. The supply as in claim 1 wherein said second amplifier includes an overload transistor having an input and an output, a battery and resistance network normally biasing said overload transistor off, a diode coupling the output of said overload transistor to the input of said driver transistor, a filter capacitor connected to stabilize said second amplifier, and short-circuit-sensing capacitor means connected to the input of said overload transistor to quickly turn it on in the event said output is short-circuited.

3. The supply as in claim 1 wherein said means to supply direct voltage to said input terminals is variable, and in further combination with a variable resistor and a battery connected in series across said output terminals, said variable resistor and said means to supply said input terminals being variable in unison whereby the bleed current through said variable resistor remains approximately constant even though said output voltage is changed over a wide range.

4. An improved, all-transistor regulated voltage supply comprising a first and a second input terminal, a first and a second output terminal, means to supply a direct voltage to said input terminals, a conductive connection between said second input and output terminals, an output lead connected to said first output terminal, a power regulating transistor having two output electrodes and a control electrode, low ohmic connections joining said output electrodes to said output lead and to said first input terminal, said connections including a low loss non-linear resistor, a first transistor feedback amplifier whose input is connected to said output leads and whose output is connected to the input of said power regulating transistor, and a current limiting transistor connected to said non-linear resistor to sense the current through said regulating transistor, said current limiting transistor above a pre-determined value of said current being continuously operable to limit the current through said regulating transistor to a pre-set amount, and manually variable bias means connected to said current limiting transistor whereby the current through said regulating transistor can be limited effectively at any pre-set value between full rated current and zero.

5. The supply as in claim 4 in further combination with an overload transistor connected to sense the voltage drop across and current through said regulating transistor, said overload transistor acting independently of said current limiting transistor and limiting the power dissipated in said regulating transistor to within its maximum rating, whereby said output current can be variably set at a limiting value and said regulating transistor is efficiently utilized.

6. The supply as in claim 4 wherein said non-linear resistor comprises a silicon diode conducting in the forward direction.

7. An improved regulated voltage supply comprising a source of unregulated direct voltage, said source having a first variable element which can be manually adjusted to set the value of the unregulated voltage, a pair of output terminals, a power regulating transistor connected in series with said source and said output terminals, a feedback amplifier connected between said output terminals and said regulating transistor to sense the voltage between said terminals and to amplify variations in said voltage from a pre-determined value and to apply a control signal to said regulating transistor to keep said output voltage constant, said amplifier containing a second variable element which can be manually adjusted to set the magnitude of said output voltage, said first and second elements being ganged together, and a variable resistor connected in series with said output terminals to improve the transient stability of said supply, said variable resistor being ganged with said first and second variable elements so that the current bled through it is approximately constant at any level of output voltage.

8. A regulated voltage supply having an improved protection circuit, said supply comprising a pair of input terminals to be supplied with an unregulated voltage, a pair of output terminals, a conductive connection between one input terminal and an output terminal, a power regulating transistor connected between the other input and the other output terminal, a voltage feedback amplifier connected to said other output terminal to apply a control voltage to said regulating transistor in such phase as to keep the voltage on said output terminals substantially constant at a set value, current sensing means to measure the current through said regulating transistor, voltage sensing means for measuring the voltage drop across said transistor, overload transistor means including a second feedback amplifier to variably control said regulating transistor, said second amplifier having means to attenuate its upper frequency response, and having a transient responsive capacitor connected to sense the output voltage and in response to a short circuit to quickly operate said second amplifier to limit the current through said regulating transistor, said overload transistor means being controlled by said current sensing and voltage sensing means to continuously control said regulating transistor on the occurrence of one of excessive current therethrough and voltage drop thereacross.

9. A regulated voltage supply having an improved protection circuit, said supply comprising a pair of input terminals to be supplied with an unregulated voltage, a pair of output terminals, a conductive connection between one input terminal and an output terminal, a power regulating transistor connected between the other input and the other output terminal, a voltage feedback amplifier connected to said other output terminal to apply a control voltage to said regulating transistor in such phase as to keep the voltage on said output terminals substantially constant at a set value, non-linear current sensing means to measure the current through said regulating transistor, overload transistor means including a second feedback amplifier to variably control said regulating transistor, said second amplifier having means to attenuate its upper frequency response and having a transient responsive capacitor connected to sense the output voltage and in response to a short circuit to quickly operate said second amplifier to limit the current through said regulating transistor, said overload transistor means being controlled by said current sensing means to control said regulating transistor on the occurrence of excessive current through it.

References Cited in the file of this patent

UNITED STATES PATENTS

| | | |
|---|---|---|
| 2,117,138 | Bock | May 10, 1938 |
| 2,693,568 | Chase | Nov. 2, 1954 |
| 2,697,811 | Deming | Dec. 21, 1954 |
| 2,832,034 | Lilienstein et al. | Apr. 22, 1958 |
| 2,832,900 | Ford | Apr. 29, 1958 |
| 2,888,633 | Carter | May 26, 1959 |
| 2,904,742 | Chase | Sept. 15, 1959 |
| 2,912,635 | Moore | Nov. 10, 1959 |